May 26, 1970  MASAYUKI SAKURAI ETAL  3,513,972
APPARATUS FOR SELECTING SHEET-FORM ARTICLES
Filed July 23, 1968

*INVENTOR.*

*INVENTOR.*

FIG. 14

United States Patent Office 3,513,972
Patented May 26, 1970

3,513,972
APPARATUS FOR SELECTING SHEET-FORM ARTICLES
Masayuki Sakurai, Tokyo, Teiichi Okamoto and Tsutomu Honjo, Kawasaki-shi, Hideya Saimei, Tokyo, Juta Kazumoto, Yokohama-shi, and So Kamimura, Kawasaki-shi, Japan, assignors to Tokyo Shibaura Electric Co., Ltd., Kawasaki-shi, Japan, a corporation of Japan
Filed July 23, 1968, Ser. No. 746,867
Claims priority, application Japan, July 31, 1967, 42/48,959, 42/48,969, 42/65,728, 42/65,737, 42/65,740
Int. Cl. B07c 1/10
U.S. Cl. 209—75                          2 Claims

ABSTRACT OF THE DISCLOSURE

An apparatus for automatically selecting sheet-form articles having a specific weight, thickness, width and rigidness includes a weight selector positioned at the rear portion of the apparatus so as to select the article during its upward travel: a thickness selector having belt-conveyors stepwise positioned at the middle portion of the apparatus in a staggered fashion, and a transverse belt-conveyor corresponding to each of the staggered belt-conveyors so as to select the article by passing it through a space between both types of belt-conveyors during its forward travel; a divider disposed at the forward portion of the apparatus to divide the selected articles into two groups respectively to be conveyed to two opposite transporting paths, said paths extending rearward and respectively disposed on either lower side of the apparatus; and means for sorting articles of the predetermined width and rigidness from among those brought to the middle part of the respective paths.

---

This invention relates to an apparatus for selecting sheet-form articles and more particularly to an apparatus for sorting sheet-form articles such as a post card and enveloped mail matter having a specific weight, thickness, width and rigidness.

The increasing quantity of mail matter as a result of the development of communication has required a new sorting apparatus to be so designed as to handle such increasing mail articles with sufficient speed and accuracy.

However, such selecting apparatus inevitably involves a large number of devices for sorting the mail articles according to the different degrees of weight, thickness, width and rigidness of the sheeted materials themselves of the mail articles as well as those of each mail article as a whole, but it is demanded to be as compact as possible for practical application. Otherwise, it would occupy an unduly large space anywhere it is employed.

An object of this invention is to provide an apparatus for automatically selecting sheet-form articles involving a large number of devices assembled in a compact form.

In an aspect of this invention, the selecting apparatus comprises a first device positioned at the rear portion of the apparatus and having a conveyor with a perforated endless belt, which extends in a substantially vertical direction, and an evacuating means positioned on the back side of the belt-conveyor, so as to select sheet-form articles having a smaller specific weight than a predetermined weight during the upward travel of the articles; a second device having belt-conveyors stepwise positioned at the middle portion of the apparatus in a staggered fashion, and a transverse belt-conveyor corresponding to each of the staggered belt-conveyors so as to select thinner articles than predetermined from among those which have previously been selected with respect to the weight thereof, by passing the articles through a space between both types of belt-conveyors during their forward travel; a divider disposed at the forward portion of the apparatus to divide the selected articles into two groups respectively to be conveyed to two opposite transporting paths, said paths extending rearward and respectively disposed on either lower side of the apparatus; and means for sorting articles of the predetermined width and rigidness from among those brought to the respective paths.

In the thickness selecting process arrangement, the transverse belt-conveyor may have a belt, the lower side edge of which is spaced from the upper surface of the corresponding belt-conveyor by the predetermined article thickness, so as to prevent thicker articles than predetermined and superposed articles from passing through the space under the selector thereby to convey these two kinds of articles sidewise.

This invention can be more fully understood from the following detailed description when taken in connection with the accompanying drawings, in which.

An apparatus of this invention illustrated in FIGS. 1 to 5 includes a first device 1 for selecting sheet-form articles such as a post card and enveloped mail matter having a smaller weight than predetermined, a second device 2 for selecting thinner articles than predetermined from among those which have previously been selected with respect to the weight thereof, and a divider 3 for dividing the selected articles into two groups respectively to be conveyed to two opposite transporting parts 4 and 4a.

The sorting device further includes means 5 and 6 for sorting articles of the predetermined width and rigidness respectively from among those brought to the respective paths.

Figure 1:
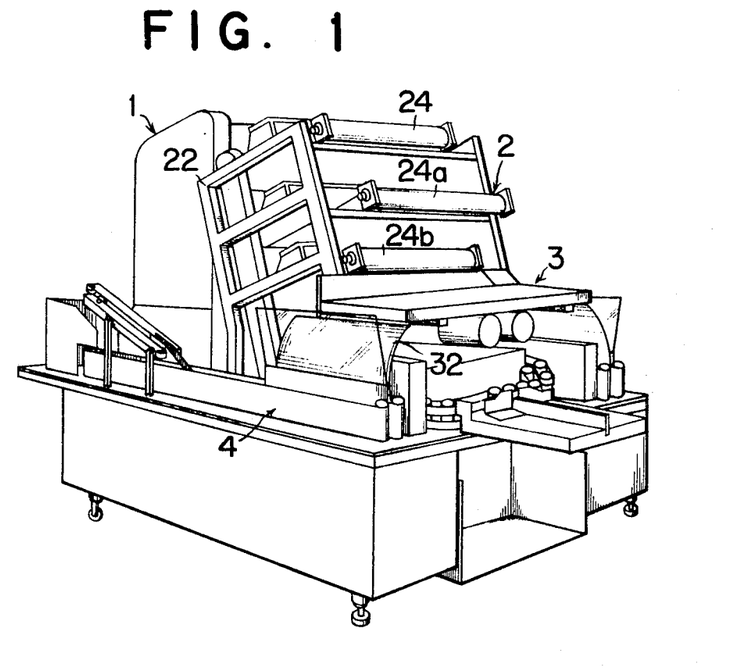
FIG. 1 is a diagrammatical perspective view of an apparatus for automatically selecting sheet-form articles embodying this invention.
Figure 2:
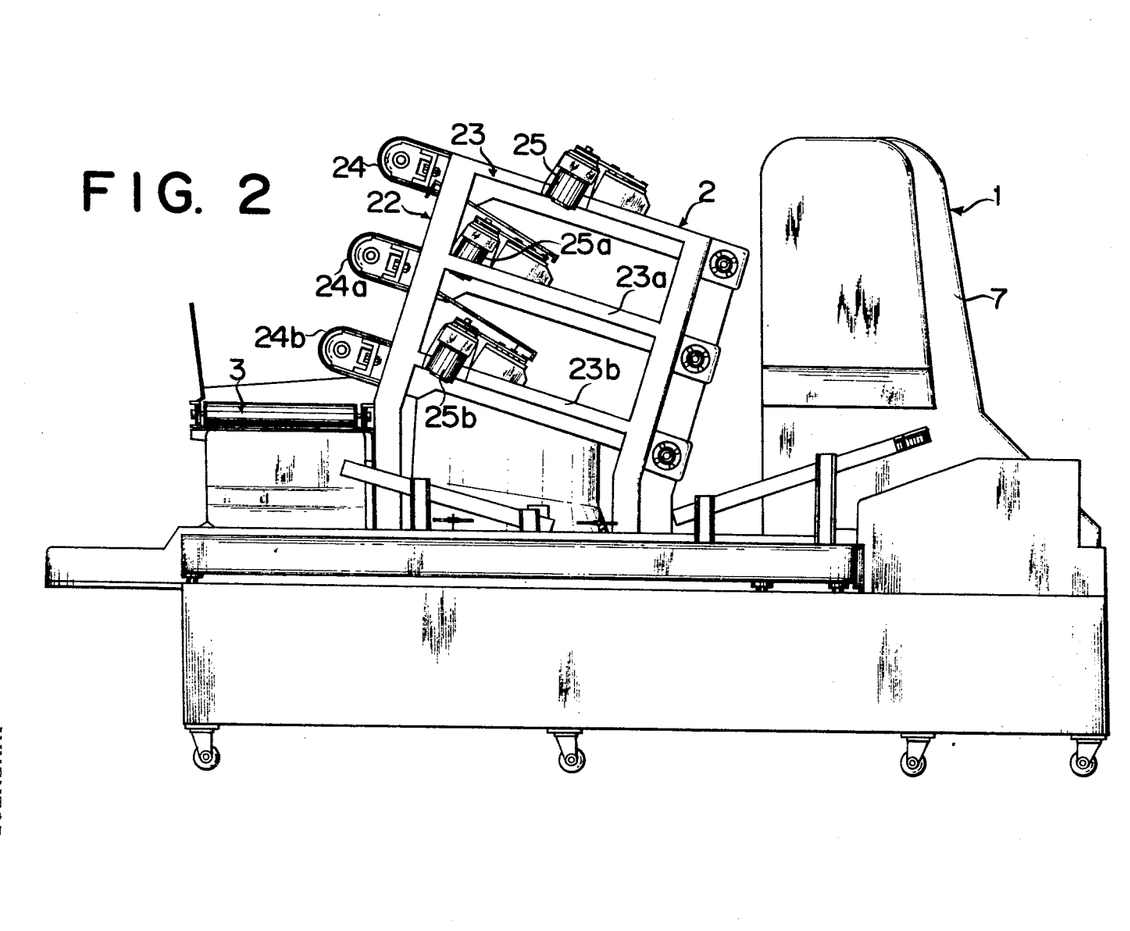
FIG. 2 is a side elevation of the selecting apparatus illustrated in FIG. 1.
Figure 3:
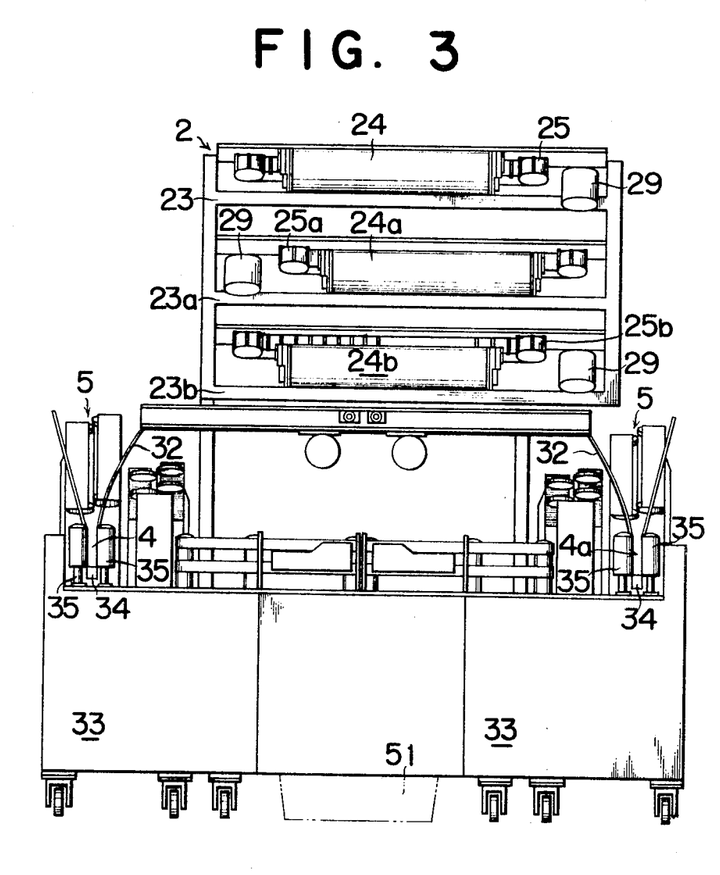
FIG. 3 is a front elevation of the selecting apparatus similarly illustrated in FIG. 1.
Figure 4:
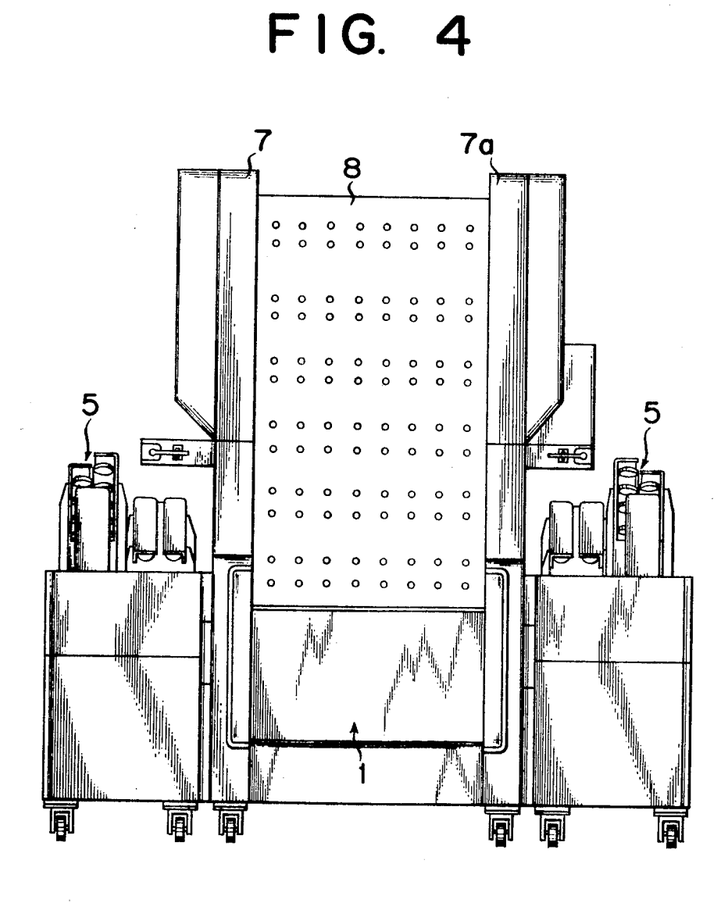
FIG. 4 is a rear elevation of the selecting apparatus further illustrated in FIG. 1.
Figure 5:
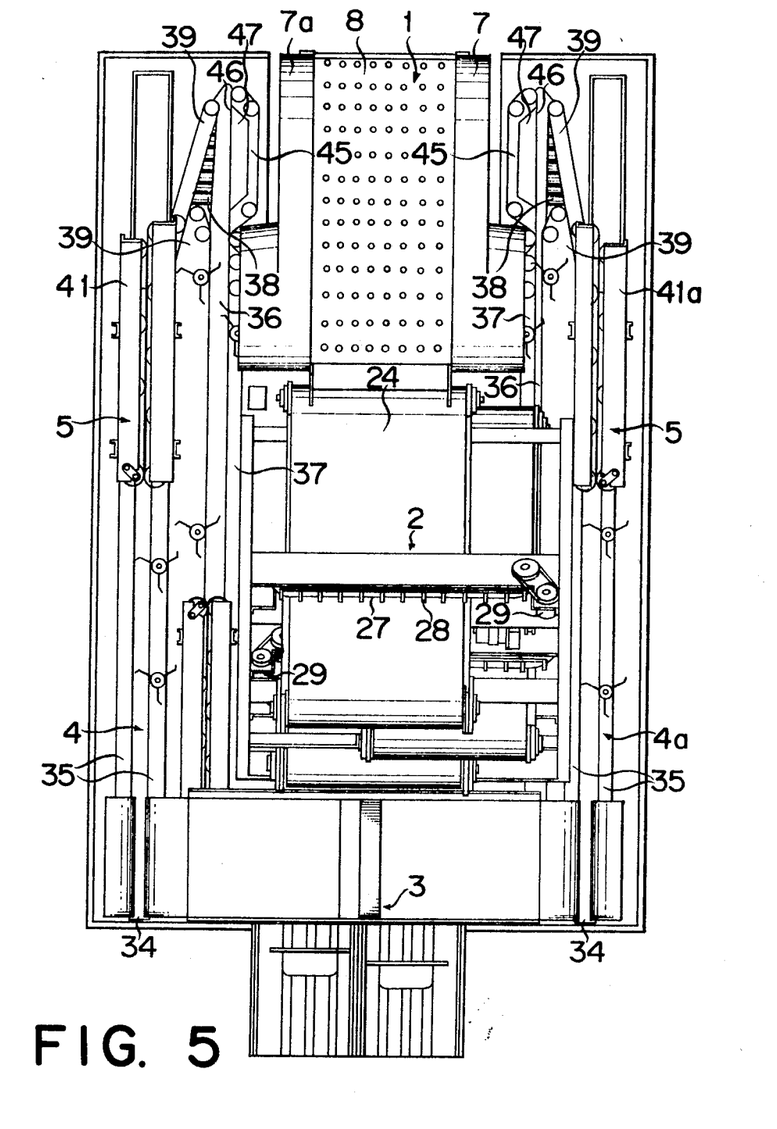
FIG. 5 is a plan view of the selecting apparatus shown in FIG. 1.

The first selecting device or weight selector is positioned at the rear portion of the apparatus. The selector 1 includes two mutually opposite side frames 7 and 7a vertically extending and bridged by means of separate frames, a belt-wheel assembly, a perforated endless belt 8 wound about the belt-wheels of the assembly (detailed hereinafter), and an evacuating means 9 disposed in the space surrounded by the belt 8.

Figure 6:
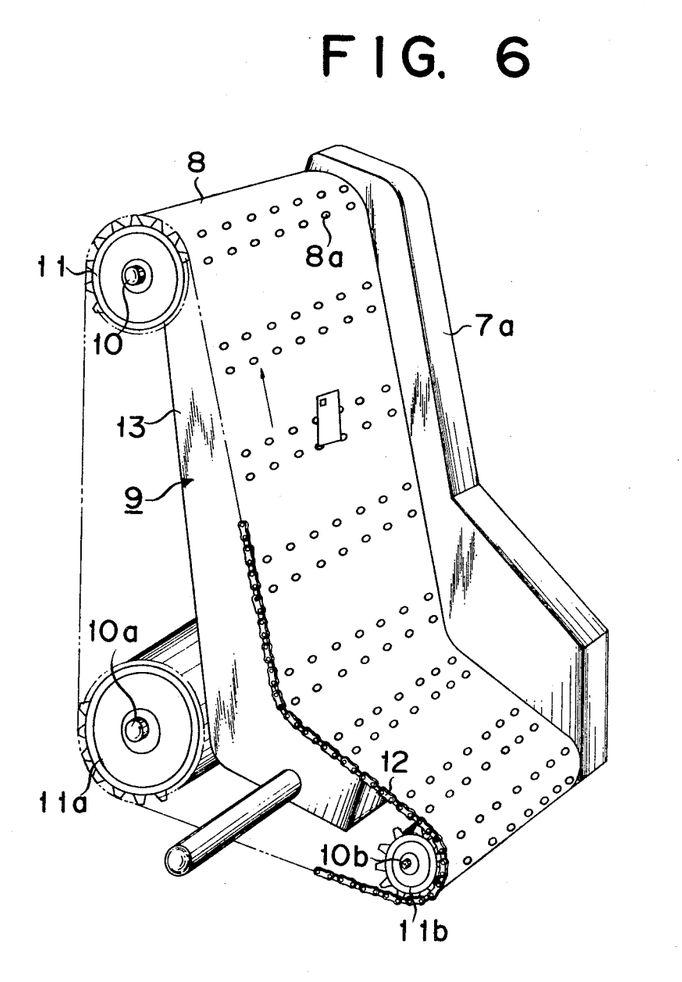
FIG. 6 is a perspective view of a part of the selecting apparatus, i.e. a first device for selecting sheet-form articles having a smaller weight than predetermined, wherein the side wall of the device is broken away.

As illustrated in FIG. 6, the belt-wheel assembly has a plurality of horizontal shafts 10, 10a and 10b, each of which is rotatably carried on two sleeve bearings (not shown) disposed on the side frames 7 and 7a respectively, belt-wheels (not shown) securely fixed on the shafts respectively, and sprocket wheels 11, 11a and 11b mounted on those parts of the shafts adjacent to the corresponding belt-wheels. The first belt-wheel is positioned at the upper portions of the side frames, the second one at the forward lower portions thereof, and the third one at the rear lower portions. The shaft 10a disposed at the forward lower portions of the frames is used as a driving shaft connected with a motor shaft through a transmission mechanism.

On the side edge of the belt 8 is mounted an endless chain 12 which registers with the sprocket-wheels 11, 11a and 11b.

The endless belt 8 having a plurality of apertures 8a for each unit area and the belt-wheel assemblies jointly constitute a belt-conveyor extending in a substantially vertical direction.

The evacuating means 9 includes a vacuum chamber 13 disposed in an area defined by the belt-conveyor with the suction port (not shown) thereof and open to the back side of the ascent of the belt-conveyor so as to attach the sheet-form articles to the outer surface of the belt 8 by sucking air through the apertures during the operation of the belt-conveyor. Therefore, articles of smaller weight than predetermined, for example, government post cards are transported upwards along with the travel of the belt-conveyor by being attached to the surface of the belt due to the suction force of the evacuating means, whereas larger weight articles, for example, private post cards of greater thickness and/or density than the government ones, and other articles having a smaller contact area fall down from the ascent of the belt-conveyor as a result of the insufficient suction force thereof to keep them on the surface of the ascending belt.

The articles selected by weight are carried over the top of the belt-conveyor to the next selector, and the remaining articles fall off the ascent of the belt-conveyor to be collected at the lower portion thereof and thereafter removed. Of the superposed articles to be further transported as sucked by the aforementioned belt, only the one contacting said belt is carried upwards, whereas the remainder fall off.

Figure 7:
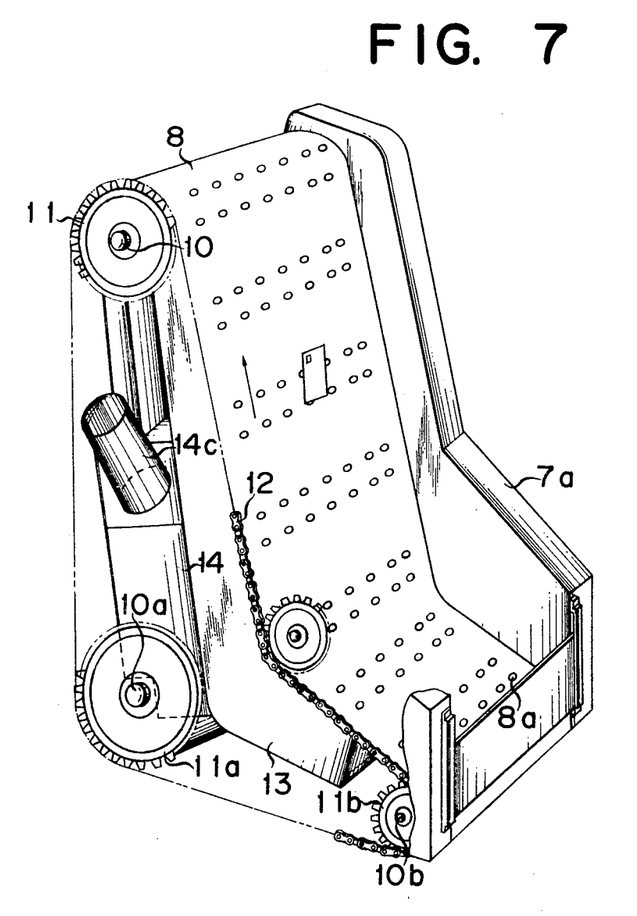
FIG. 7 is a perspective view of a first device modified from that illustrated in FIG. 6.
Figure 8:
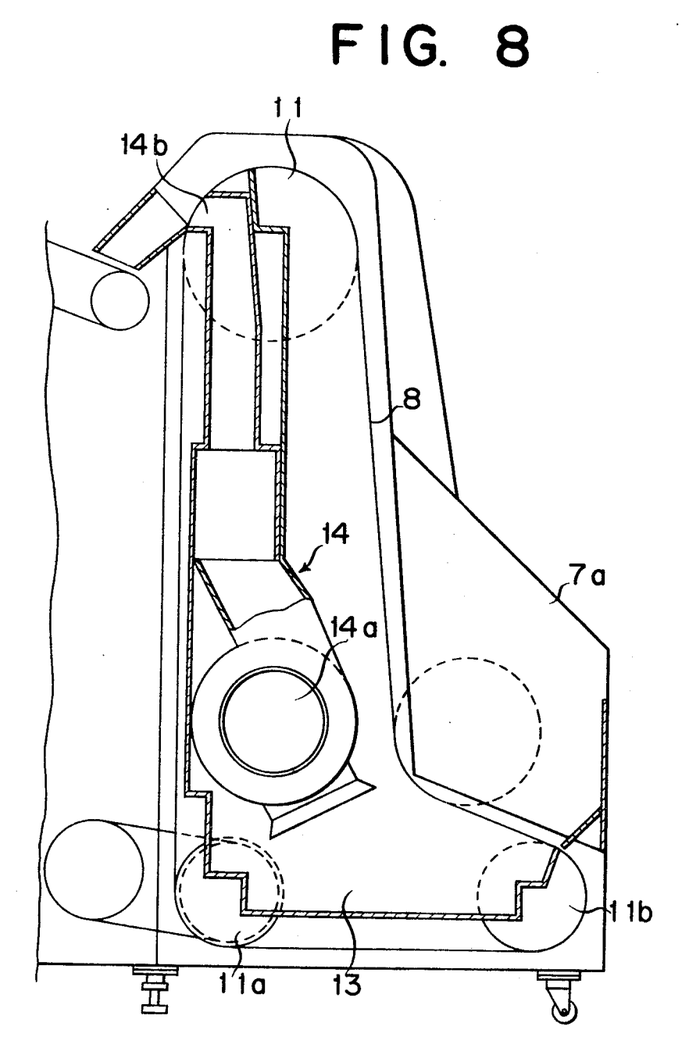
FIG. 8 is a cross-sectional side elevation of the device shown in FIG. 7.

In the modification indicated in FIGS. 7 and 8, the first selecting device involves an air blower 14 positioned on the forward side of the vacuum chamber 13. The suction port 14a of the air blower is open to the inside of the chamber 13 and the delivery port 14b thereof open to the forward top of the space defined by the belt 8 in a manner to face the back of the belt.

If necessary, the delivery duct of the air blower 14 may be provided with a branch 14c.

Accordingly, the selected articles carried over the top of the belt-conveyor are blown away from the outer surface of the belt to the next selector.

Figure 9:
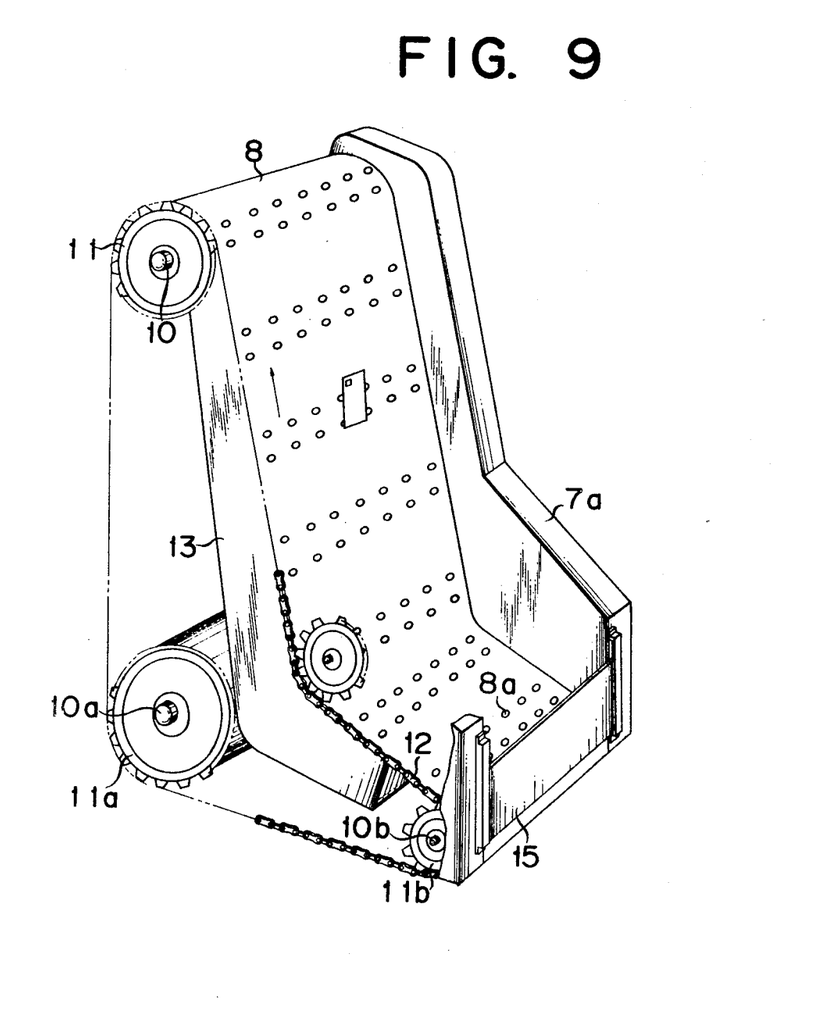
FIG. 9 is a perspective view of a first device further modified from that illustrated in FIG. 6.
Figure 10:
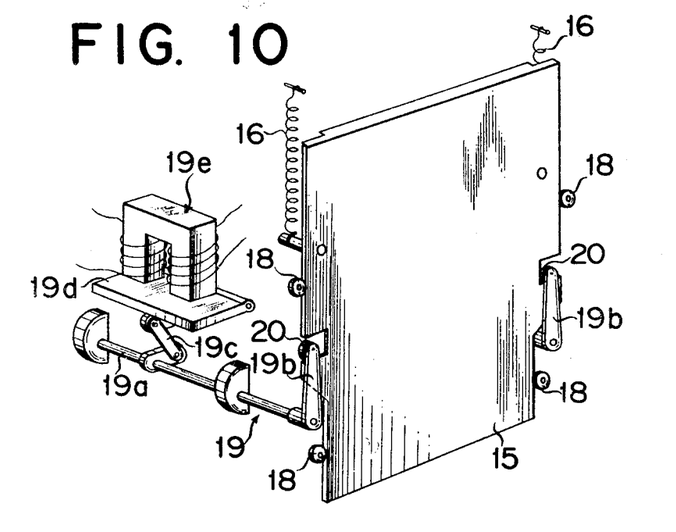
FIG. 10 is a perspective view of a gate with an operating means included in the first device indicated in FIG. 9.
Figure 11:
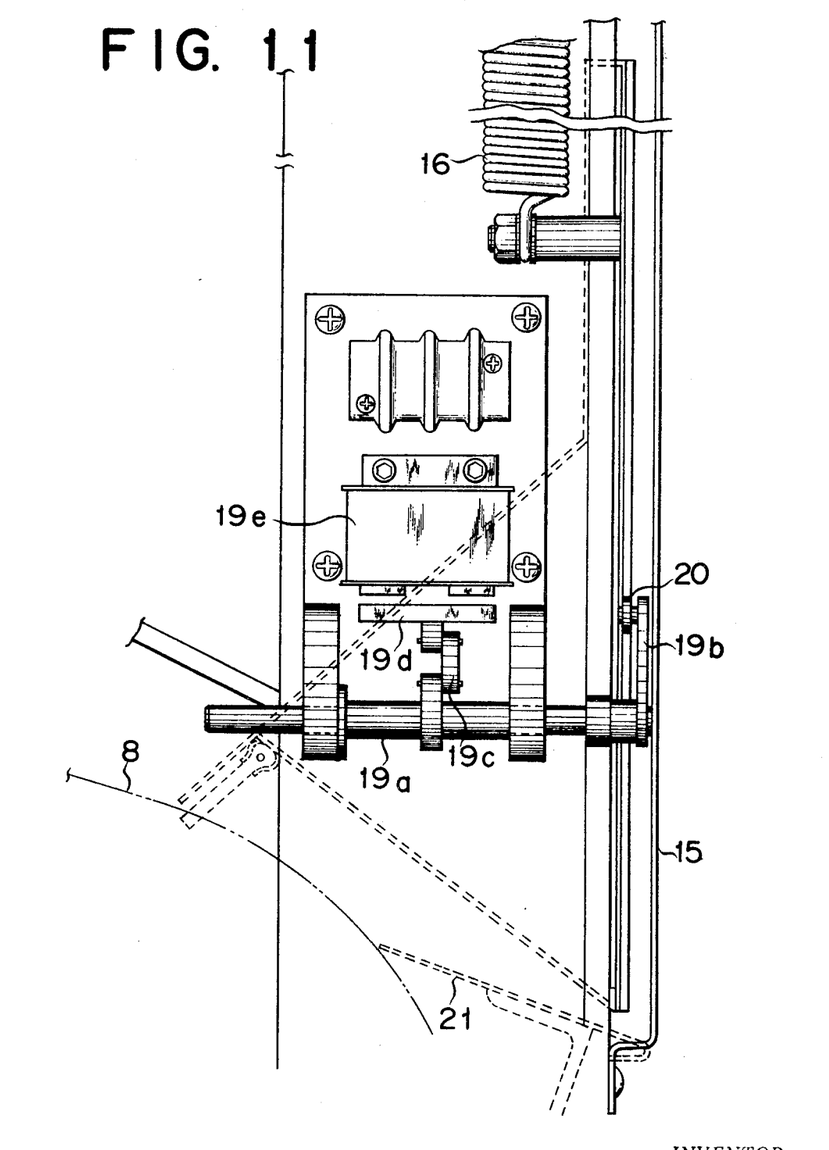
FIG. 11 is an enlarged side view of the part of the gate illustrated in FIG. 10.

In the modification indicated in FIGS. 9, 10 and 11, the first selecting device can be operated in a manner to reverse the rotation of the belt-wheels by the drive of the reversible motor. The selecting device is provided with a vertically movable gate 15 similar to those illustrated, but not described, in connection with the two embodiments of the aforementioned first selecting device. The gate 15 is always urged upwards by means of tension springs 16, respectively disposed in the void spaces formed in the side frames 7 and 7a. Both sides of the gate plate 15 are positioned in grooved guide members 17 and 17a which are attached to the lower rear portions of the frames. In each of the guide members are rotatably placed guide rollers 18 adapted for the gate 15 to be smoothly guided in a vertical direction.

Means 19 for locking the gate plate 15 with the guide members 17 and 17a is positioned in the void spaces defined by the side frames, and has a horizontal axle 19a journaled to the inner wall of the side frame in a perpendicular direction of the gate, a locking lever 19b securely fixed at the rear end of the axle and having a roller 20, a linkage 19c mounted on the middle portion of the axle, and an operating plate 19d connected with the linkage and capable of being magnetically attracted to the core of an electromagnet 19e when it is energised. On the other hand, the gate plate is provided with a triangular protrusion rising upwards from the side face and having a stage formed at the top.

When the belt-conveyor is driven for selecting the articles the roller 20 is brought to the stage against the force of the tension spring 16 so as to lock the gate plate with the guide members.

When the belt-conveyor is driven in an opposite direction, the electromagnet is energised to attract the operating plate, whereby the axle is rotated via the linkage and causes the locking lever to be rotated in a direction in which the roller 20 is carried away from the stage.

Accordingly, the gate plate 15 is raised by the force of the tension spring 16 so that the articles collected at the lower portion of the belt-conveyor are removed through the opening under the gate plate. In this case, a guide plate 21 may be positioned at the lower portion of the belt-conveyor and slightly inclined downward to the rear portion of the selecting device. The forward edge of the guide plate 21 is slidably attached to the outer surface of the belt 8, so as smoothly to deliver the articles from the selecting device.

After removing the articles, the belt-conveyor is again driven in the original direction in which articles to be freshly supplied will be carried up the vertical portion of the belt-conveyor, and the gate plate 15 is pulled down against the spring force so that the roller 20 slides along the inclined surface of the protrusion and reaches the stage thereof whereby the gate is again engaged with the guide members.

Figure 12:
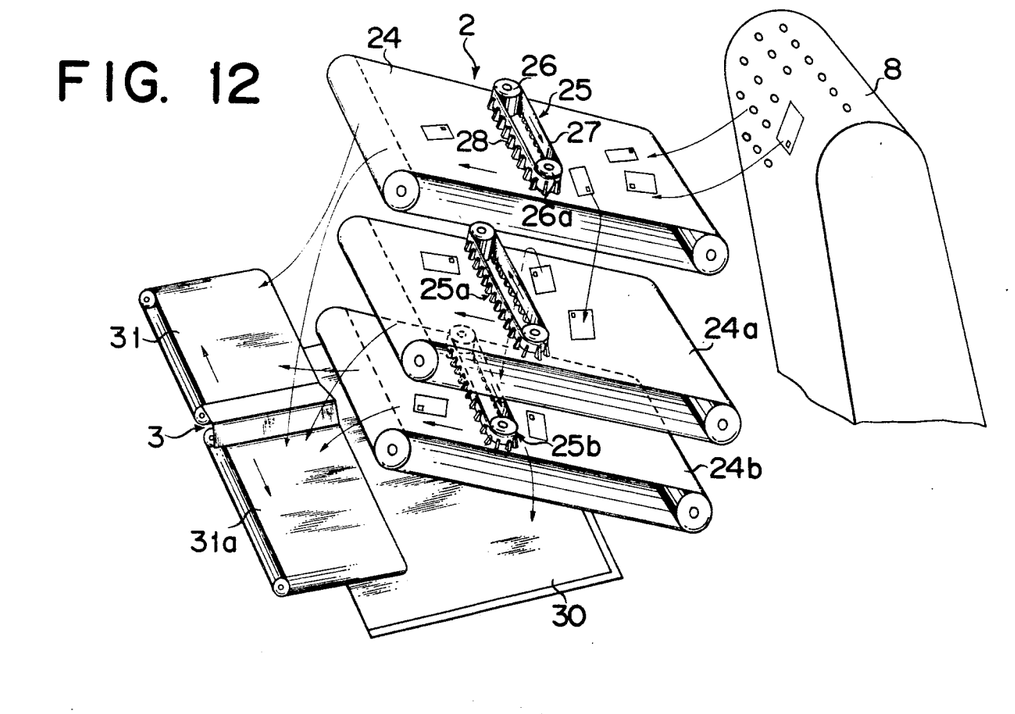
FIG. 12 is a perspective view of a second device for selecting thinner articles than predetermined.

The second selecting device or thickness selector 2 is positioned at the middle portion of the apparatus. The selector 2 includes a three-dimentional latticed frame 22 having three stages 23, 23a and 23b, three belt-conveyors 24, 24a and 24b positioned at the respective stages and three transverse belt-conveyors 25, 25a and 25b corresponding to the respective belt-conveyors 24, 24a and 24b. These belts 24, 24a and 24b travel at a higher speed than the weight-selecting belt 8.

The belt-conveyors 24, 24a and 24b are staggeredly arranged in a crosswise direction as viewed from the front of the belt-conveyor assembly. In this arrangement, the uppermost belt-conveyor 24 is adapted to receive the articles from the first selector selected by weight and transport them from the rear portion to the forward portion thereof. The outer belt-conveyors 24a and 24b are intended to receive the articles which have fallen off one side edge of each preceding belt-conveyor by the operation of the transverse belt-conveyor (detailed hereinafter) corresponding thereto.

The transverse belt-conveyors 25, 25a and 25b are arranged on the belt-conveyors 24, 24a and 24b respectively in such a manner that the distances between the former conveyors and the rear ends of the latter ones progressively increase as measured from the top of the belt-conveyor assembly.

Figure 13:
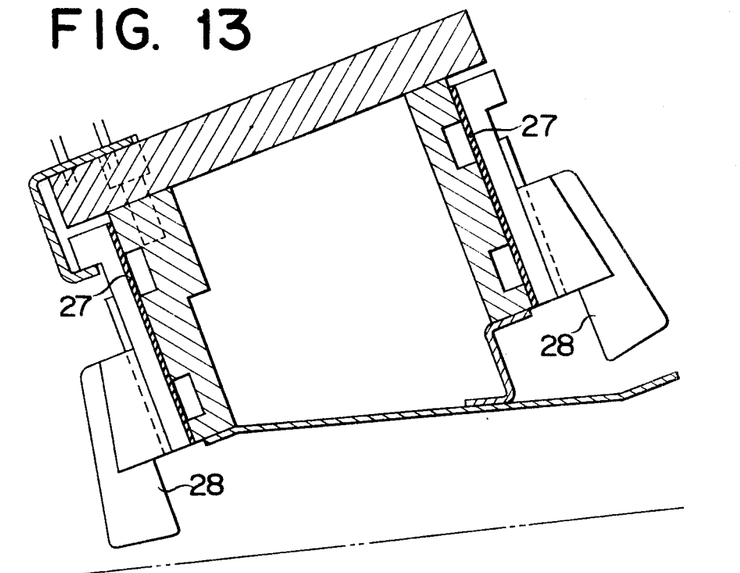
FIG. 13 is a cross-sectional side elevation of the transverse belt-conveyor of the second device.

Each of the transverse belt-conveyors has a pair of the belt-wheels 26 and 26a vertically journaled on the frame 22, and a raked endless belt 27 wound about the belt-wheels 26 and 26a and having a plurality of claws 28.

The claws 28 extend downwards from the lower edge of the raked belt 27 in such a manner that the gap between the lower end of the claw and the upper surface of the transporting belt-conveyor is set at a prescribed distance through which can be passed only the articles such as government post cards of a specific thickness.

Each of the transverse belt-conveyors is driven by a driving motor 29 mounted on each of the stages. In this case, the transverse belt-conveyors 25 and 25b travel in a clockwise direction, whereas the other one 25a travels in an anticlockwise direction.

Separate articles (each) of a prescribed thickness are freely allowed to pass under the topmost transverse belt-conveyor 25 and fall off the forward end of the corresponding transporting belt-conveyor 24. On the other hand, articles such as private post cards thicker than prescribed and other articles relatively tightly superposed by chance in transit, when brought to this thickness selecting section, are raked by the claws of each of the transverse belt-conveyors and fall off the side edge of each of the transporting belt-conveyors by turns. The aforementioned superposed articles are unfailingly separated in the air while they are carried from one transporting belt-conveyor to another. If any of the superposed group is of the prescribed thickness, it falls after separation off the forward end of the transporting belt-conveyor instead of the side edge thereof.

At the middle bottom portion of the apparatus is provided a chute 30 which is intended to receive after selection only those individual thicker articles than prescribed.

The apparatus of the present invention effectively prevents superposed articles from being selected as a group before they are completely separated. As described above, all articles of the prescribed thickness fall off the forward end of any of the transporting belt-conveyors 24, 24a and 24b to be supplied to the next selecting mechanism (described hereinafter).

The divider 3 is positioned at the forward portion of the apparatus and below the forward end of the lowest belt conveyor 24b. The divider 3 includes two transverse belt-conveyors 31 and 31a which are serially arranged in the transverse direction of the apparatus and travel in opposite directions as departing from the center of the divider, and at a greater speed than the thickness selecting belts 24, 24a and 24b. Accordingly, the articles which still remain superposed even after passing the thickness selector are fully separated due to the falling impact, and the supplied articles are received on either of the belt-conveyors 31 and 31a so as to be divided into two groups. The divider 3 further includes a chute 32 positioned on each side thereof.

On both sides of the apparatus are positioned the transporting paths 4 and 4a extending in parallel to the side frames 33 of the apparatus, each having going and returning ways. The article-supplying section of each of the transporting paths 4 and 4a is located below the divider 3. The going and returning ways are constituted by a first floor belt-conveyor 34 with a pair of side wall belt-conveyors 35, a second floor belt-conveyor 36 with a pair of side wall belt-conveyors 37, and a roller-conveyor 38 with guide wall belt-conveyors 39 positioned between the first and second conveyor assemblies. These belts 34, 35, 36, 37, 38 and 39 are run at a higher speed than the divider belts 31 and 31a.

The side wall belt-conveyors 35 are mutually spaced on the floor belt-conveyor 34 at a distance which is necessary to cause the articles to be received on the floor 34 through the chute 32 and lean against the side wall 35.

The side wall and floor belt-conveyors 35 and 34, which respectively form a going way, are driven to transport the articles toward the rear portion of the apparatus.

Figure 14:
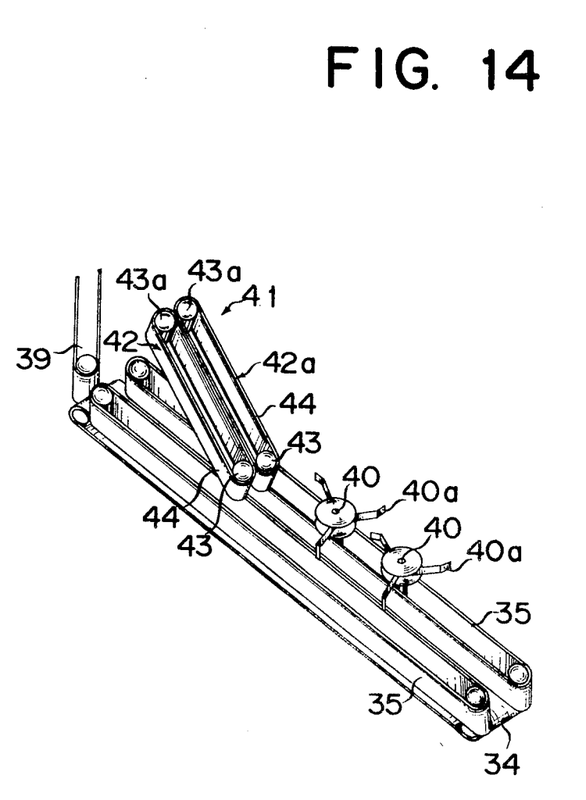
FIG. 14 is a perspective view of means for sorting articles of the predetermined width included in the selecting apparatus.

The middle portion of the going way are disposed as shown in FIG. 14, two wheels 40 vertically journaled to the side frame 33 and having blades 40a extending in a radial direction from the axle thereof. The blades 40a are intended to throw down only those articles vertically leaning against either of the side walls 35. Thereafter all articles handled including the aforementioned ones are arranged on the floor belt-conveyor 34 in a position standing on the side edge.

Two belt-conveyor assemblies 41 and 41a adapted as width selecting means 5 are positioned on both sides of the apparatus. Each belt-conveyor assembly includes two belt-conveyers 42 and 42a, which are rotated in opposite directions and each of which has two belt-wheels 43 and 43a and an endless belt 44 wound about the belt-wheels. The mutually facing portions of the belts 44 of the belt-conveyors 42 and 42a are closely attached to each other. At the forward end of the belt-conveyor assembly, the lower edges of the belts 44 are spaced from the upper surface of the floor belt-conveyor 34 at a prescribed distance slightly larger than the specific widths of articles to be selected.

Therefore, the articles of particularly greater width travelling on the floor belt-conveyor 34 are picked up therefrom with the upper portions of the articles clamped between the belt-conveyors 42 and 42a, whereas the remaining articles of smaller width than the aforementioned prescribed distance are smoothly transported on the floor belt-conveyor 34 under the width selecting means.

The roller-conveyor 38 is so arranged as to form a continuous transporting plane with the floor belt-conveyor 34 at the rear side portion of the apparatus and the guide wall belt-conveyors 39 are respectively so arranged as to form a continuous transporting plane with the respective side wall belt-conveyors 35. The mutually facing portions of the guide wall belt-conveyors 39 are closely attached to each other. Therefore, the articles, which have been transported to the rear end of the first belt-conveyor assembly, are in turn guided through the roller-conveyor 38 into the second belt-conveyor assembly by being clamped between the guide wall belt-conveyors 39.

A belt-conveyor 45 is further disposed at the rear portion of the apparatus. The belt-conveyor 45 faces the rear part of the outer side wall belt-conveyor 39 at a small angle and has a perforated endless belt 46. In the space surrounded by the perforated belt 46 is disposed a vacuum chamber 47 opening thereto, so as to attach the transported articles to the outer surface of the belt 46 by sucking air through the apertures thereof. To this end, the vacuum chamber 47 is provided with an evacuating means (not shown). Under such condition, the articles are transported to the second belt-conveyor assembly by the rotation of the belt-conveyor 45.

The second belt-conveyor assembly is constructed similarly to the first one but carries the articles in a direction opposite to their travel on the first floor belt-conveyor 34.

Figure 15:
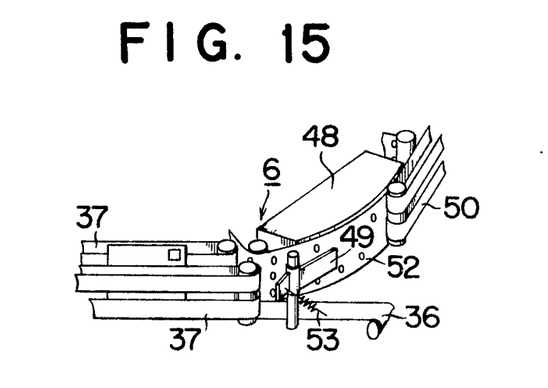
FIG. 15 is a perspective view of means for sorting articles of the predetermined rigidness included in the selecting apparatus.

The rigidness selecting means 6 is positioned at the middle side of the apparatus, and includes, as shown in FIG. 15, a vacuum chamber 48 extending to the forward end of the one disposed inside of the belt-conveyor and a deflecting plate hinged at its end by means of an axle vertically positioned on the frame. The outer wall of the vacuum chamber 48, to which a perforated belt 52 is slidably attached, inclines toward the inside of the apparatus at a suitable angle. The deflecting plate 49 extends across the second floor belt-conveyor 36 and is urged toward the perforated belt 52 by the relatively weak force of an adjusting spring 53.

Accordingly, the articles carried by the second floor belt-conveyor 36 are separately caused to contact the face of the deflecting plate 49. If the articles are so excessively rigid as not to be deflected toward the vacuum chamber 48 by the deflecting plate 49, they will be carried straight forward on the floor 36 by pushing aside the deflecting plate 49 against the spring force. Conversely if the articles are deflected due to their low rigidness, for example, government post card, they will be deviated from their course to the perforated belt 51 by the action of the deflecting plate. In this case, the vacuum chamber 48 is provided with an evacuating means (not shown).

Adjacent to the vacuum chamber 48 is disposed a path 50 for carrying the articles selected by all the aforementioned dimensional factors to a collector 51 positioned under the divider 3.

In the aforesaid width and rigidness selecting process, both articles of undue width and those of too great rigidness are removed from the apparatus by means of a suitable mechanism.

While the invention has been described in connection with some preferred embodiments thereof, the invention is not limited thereto and includes any modifications and alterations which fall within the scope of the invention as defined in the appended claims.

What is claimed is:

1. An apparatus for automatically selecting sheet-form articles comprising a first device positioned at the rear portion of the apparatus and having a conveyor with a perforated endless belt, which extends in a substantially vertical direction, and an evacuating means positioned on the back side of the ascent of the belt-conveyor, so as to select sheet-form articles having a smaller weight than predetermined during the upward travel of the articles; a second device having belt-conveyors stepwise positioned at the middle portion of the apparatus in a staggered fashion, and a transverse belt-conveyor corresponding to each of the staggered belt-conveyors so as to select thinner articles than predetermined from among those which have previously been selected with respect to the weight thereof, by passing the articles through a space between both types of belt-conveyors during their forward travel; a divider disposed at the forward portion of the apparatus to divide the selected articles into two groups respectively to be conveyed to two opposite transporting paths, said paths extending rearward and respectively disposed on either lower side of the apparatus; and means for sorting articles of the predetermined width and rigidness from among those brought to the respective paths.

2. A selecting apparatus claimed in claim 1 in which the transverse belt-conveyor has a belt, the lower side edge of which is spaced from the upper surface of the corresponding belt-conveyor by the predetermined article's thickness, so as to prevent both thicker articles than predetermined and mutually superposed articles from passing through the space under the selector thereby to convey these two kinds of articles sidewise.

References Cited

UNITED STATES PATENTS

| | | | |
|---|---|---|---|
| 2,982,407 | 5/1961 | Craig | 209—91 |
| 3,059,770 | 10/1962 | Fichtmuller | 209—115 X |
| 3,069,011 | 12/1962 | Buchwald | 209—90 |
| 3,199,673 | 8/1965 | Flint | 209—79 |
| 3,369,661 | 2/1968 | Bradshaw | 209—121 X |

RICHARD A. SCHACHER, Primary Examiner

U.S. Cl. X.R.

209—79, 90, 121